UNITED STATES PATENT OFFICE.

TERTIUS S. NORTON, OF CHICOPEE, MASSACHUSETTS.

IMPROVED METHOD OF ATTACHING STEEL TO IRON.

Specification forming part of Letters Patent No. 44,739, dated October 18, 1864.

*To all whom it may concern:*

Be it known that I, TERTIUS S. NORTON, of Chicopee, of the county of Hampden and State of Massachusetts, have invented a new and useful Improvement in Steel-Facing Tools or other Articles of Iron; and I do hereby declare the same to be fully described in the following specification.

The purpose of my invention is to affix a piece of steel to a piece of iron by brazing the two together and still preserving the temper of the steel, my invention being applicable to pliers, cutting-nippers, vises, and various other mechanical implements.

In carrying out my invention the piece or facing of steel is to be brazed to the piece of iron in the ordinary way—that is to say, by applying borax or other suitable flux to the surfaces which are to be connected, and laying one or more pieces of brass on the joint and subjecting the whole to such a heat as will melt the brass and cause it to flow between the said surfaces. Next, while the brazing-heat may be in the steel and iron, they are to be dipped into water or a suitable hardening liquid, which will reharden the steel. Afterward, by reheating the steel so as to melt the brazing, the temper of the steel may be drawn to such extent as may be necessary.

I would observe that it has been well known that a piece of steel could be affixed to a piece of iron by the process of brazing; but as the temper of the steel would be entirely drawn by the great heat to which the brazing process would subject the steel it has been supposed that the hardening of the steel could not be afterward effected, as in so doing the brazing would be destroyed. I have discovered, however, that the reheating of the steel is not necessary to effect the hardening of it, or, in other words, that the steel, although soft at the period when the brazing to the iron takes place, (it being then at about a "white heat,") will be rehardened if then plunged into water or a hardening liquid, which at the same time will cool and set the brazing metal.

By my process brazing may be substituted for "welding" on the production or steel-facing of many useful tools or iron articles, and they be manufactured at much less cost than they can be under the welding process.

I do not claim the brazing process alone as a mode of connecting two pieces of iron together, or a piece of steel to a piece of iron; but What I do claim is—

My improved steel-facing process, the same being accomplished by brazing and hardening the steel under one and the same heating of it, such as may be requisite for effecting the melting of the brazing metal, as specified.

TERTIUS S. NORTON.

Witnesses:
R. H. EDDY,
F. R. HALE, Jr.